United States Patent [19]

Pacifici et al.

[11] 4,297,860
[45] Nov. 3, 1981

[54] DEVICE FOR APPLYING FOAM TO TEXTILES

[75] Inventors: Joseph A. Pacifici, LaGrange, Ga.; Jerry L. White, Riverview, Ala.

[73] Assignee: West Point Pepperell, Inc., West Point, Ga.

[21] Appl. No.: 171,277

[22] Filed: Jul. 23, 1980

[51] Int. Cl.³ .............................................. D06B 1/08
[52] U.S. Cl. ..................................... 68/200; 118/600; 118/413; 118/415
[58] Field of Search .............. 118/410, 413, 415, 600, 118/612; 427/373; 425/4 C; 156/78; 169/14, 15; 239/343; 222/190; 68/200

[56] References Cited

U.S. PATENT DOCUMENTS

| | | | |
|---|---|---|---|
| 2,090,727 | 8/1937 | Gosmann | 239/343 X |
| 2,514,107 | 7/1950 | Trostler | 239/343 X |
| 2,715,045 | 8/1955 | Thompson | 239/343 |
| 3,181,199 | 5/1965 | Voelker | 425/4 C |
| 3,969,780 | 7/1976 | Henderson | |
| 4,023,526 | 5/1977 | Ashmus et al. | |
| 4,038,037 | 7/1977 | Wilmsen | |
| 4,061,001 | 12/1977 | Von der Eltz et al. | 118/415 X |
| 4,099,913 | 7/1978 | Walter et al. | |
| 4,118,526 | 10/1978 | Gregorian et al. | |
| 4,195,527 | 4/1980 | Ebeling et al. | |
| 4,201,321 | 5/1980 | Patzelt et al. | 118/415 X |

OTHER PUBLICATIONS

"Application Techniques for Foam Dyeing & Finishing", Dr. Werner Hartmann, *Canadian Textile Journal*, Apr. 1980, p. 55.
"New European Dye Technology", *Textile Industries*, May, 1980, p. 30.
"Foam Processing Technology", Richard J. Lyons, *American Dyestuff Reports*, Apr. 1980, p. 22.
"Foam Finishing Technology: The Controlled Application of Chemicals to a Moving Substrate", *Textile Chemists & Colorists*, Dec., 1978, p. 269/37.

*Primary Examiner*—John P. McIntosh
*Attorney, Agent, or Firm*—Cushman, Darby & Cushman

[57] ABSTRACT

Metered amounts of air and liquid are mixed to produce a foam which is directed to an applicator. The applicator includes an apertured spreading plate, a bed of porous material, and a contour which converges towards a discharge orifice to uniformly distribute the foam across the orifice.

13 Claims, 4 Drawing Figures

DEVICE FOR APPLYING FOAM TO TEXTILES

BACKGROUND OF THE INVENTION

It is well recognized that wet processing in the textile industry is a major source of energy consumption. With the advent of high energy costs, and concern as to the availability of oil and natural gas, considerable effort has been expended in reducing energy usage for wet processing techniques such as bleaching, dyeing, printing and finishing.

A technology which has developed as a result of energy conservation research in the textile field is the use of foams for wet processing. By foaming techniques, the amount of liquid applied to the textiles is reduced substantially thereby greatly lowering the amount of energy required to dry the product. Not only is there a saving of energy, but foaming also permits increased productivity and a variety of other advantages.

Known foaming techniques generally utilize metering rolls and/or doctor blades for applying the correct amount of foam to the textile. When using these techniques for a product such as a pile carpet, wherein uniform penetration is important, either the carpet weight must be kept low, or vacuum slots and squeeze rolls are required to achieve acceptable penetration of liquid into the pile. Additionally, the foam must have a high air-to-liquid ratio (sometimes called a "blow ratio") so as to have sufficient viscosity to be uniformly applied by the roll and blade arrangements.

Various additional considerations of foaming techniques in the textile industry are discussed in the following articles:

"Application Techniques for Foam Dyeing and Finishing" by Dr. Werner Hartmann, appearing in the *Canadian Textile Journal*, April, 1980, p. 55;

"New European Dye Technology", appearing in *Textile Industries*, May, 1980, p. 30;

"Foam Processing Technology" by Richard J. Lyons, appearing in American Dyestuff Reports, April 1980, p. 22; and "Foam Finishing Technology: The Controlled Application of Chemicals to a Moving Substrate", appearing in *Textile Chemists and Colorists*, December, 1978, p. 269/37.

The latter generally discloses an arrangement for applying foam under pressure to a fabric. This, of course, requires control of the applicator whereby the pressure is maintained at level which will permit uniform application of the foam.

SUMMARY OF THE INVENTION

The present invention relates to a device for producing a uniform foam having a desired blow ratio ranging from low to high, depending on the particular application for which the foam is intended. For example, a foam having a low blow ratio is low in viscosity and collapses to the liquid state readily. Consequently, such a foam is suitable for dyeing carpet inasmuch as when it is deposited on the file from an applicator, the foam penetrates the carpet pile and then collapses and diffuses upon steaming to produce uniform dyeing throughout the pile.

Briefly, in a preferred embodiment of the invention, metered amounts of air and liquid under pressure are premixed and the mixture then is directed through a static foamer to develop a foam. The foamer includes means for building up a back pressure whereby as the foam moves through the foamer, the desired bubble size and viscosity of the foam is achieved. On leaving the static foamer, the foam enters an applicator. The applicator includes a spreader plate having a plurality of apertures. The plate is oriented in a plane extending substantially normal to the path of movement of the foam whereby the foam is distributed across the applicator. Downstream of the plate, the applicator is trapezoidal, as viewed in section along a plane extending in the direction of foam movement. The trapezoidally-shaped portion of the applicator also includes a porous bed, such as glass beads. Consequently, as the foam flows within the trapezoidally-shaped portion and through the bed, it is uniformly distributed across a discharge orifice provided in the applicator. On exiting from this orifice, the foam is deposited on a textile product which is moved past the applicator.

DETAILED DESCRIPTION OF THE INVENTION

The invention will be described in detail with respect to the accompanying drawings wherein.

Figure 1:
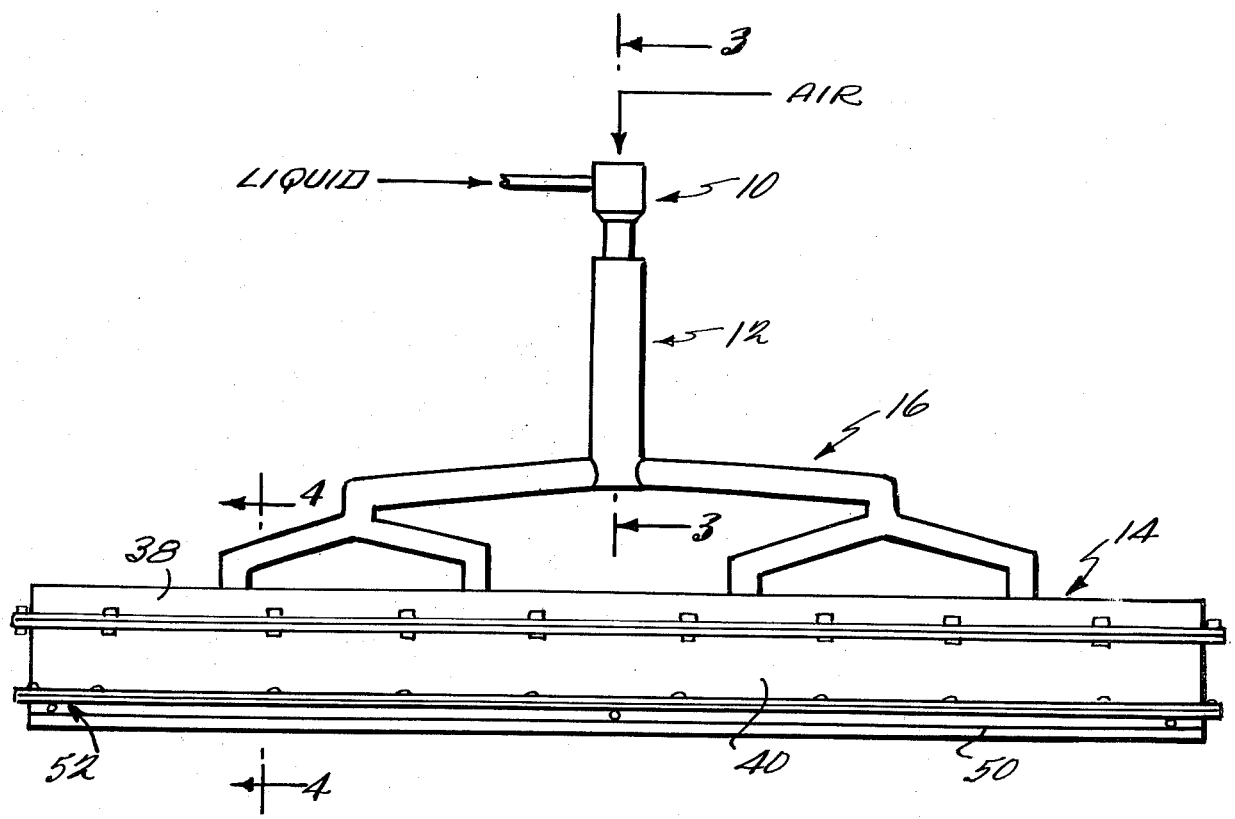
FIG. 1 is an elevational view of a preferred embodiment of the invention.
Figure 2:
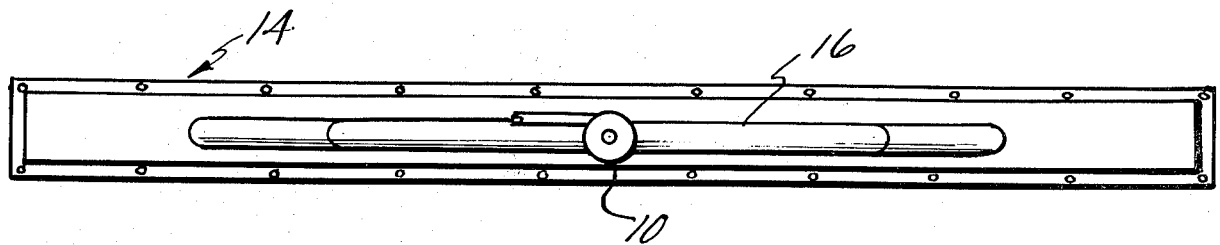
FIG. 2 is a top plan view thereof.

Referring to FIGS. 1 and 2 of the drawings, the foam-producing apparatus generally comprises a premixer 10, a static foamer 12 and an applicator 14, the latter being joined to the foamer by a header arrangement 16.

Figure 3:
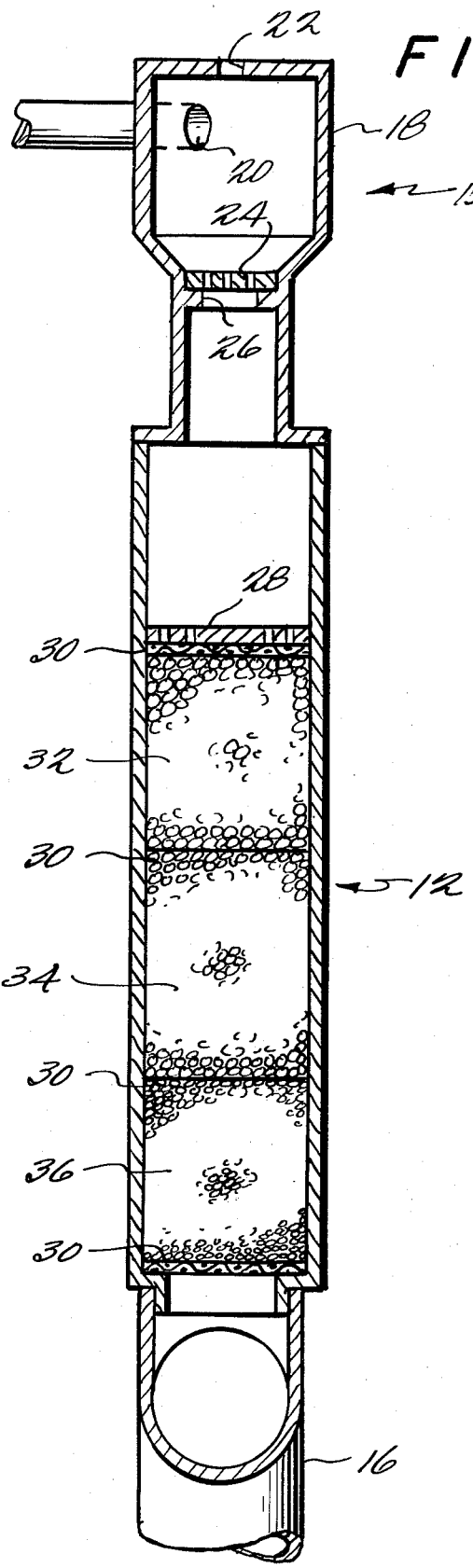
FIG. 3 is an enlarged sectional view of a premixer and static foamer taken along line 3—3 of FIG. 1.

Details of the premixer and static foamer can be better appreciated with reference to FIG. 3. More particularly, the premixer 10 comprises a housing 18 having a wall which is provided with an aperture 20 through which liquid under pressure is introduced into the premixer. By being substantially tangential to the interior surface of wall 18, the liquid moves as a vortex within the premixer. Pressurized air is applied through an opening 22 centrally located at the top of housing 18. Both the air and the liquid supplied to the premixer 10 are metered by conventional means (not shown).

Within premixer 10, an apertured plate 24 is provided above a constriction 26. The plate and constriction serve to develop back pressure to cause the liquid and air to be thoroughly mixed. As the mixture passes through premixer 10, the constriction also operates as a nozzle to cause the frothy liquid-air mixture to exit the premixer as a jet which enters the static foamer 12.

An apertured plate 28 is positioned within foamer 12 intermediate its ends. Preferably plate 28 has a solid center portion surrounded by the apertures. These apertures are of increasing diameter as they progress outwardly from the center of the plate. As the mixture is received from the premixer 10, plate 28 develops some back pressure and the arrangement of apertures promotes uniform distribution of the mixture across the foamer.

The mixture passing through the apertures in the plate 28 proceeds through a first screen 30 into a series of chambers 32, 34 and 36 defined by additional screens 30 supported in spaced relationship within the cylindrical foamer 12. Each of the chambers contains a bed of porous material, each bed being formed of a material of different size. A suitable material for this purpose are beads formed from various substances, e.g. glass. In an exemplary case, chamber 32 is filled with 3 mm beads, chamber 34 has beads of 1 mm size, and chamber 36 contains 0.5 mm beads. In passing through such an array of beads, the back pressure developed by the beads causes a shearing action on the mixture whereby the foam changes in bubble size and viscosity. Of course, the sizes of the beads and length of each bead-containing chamber are selected to produce the foam characteristics desired.

While the preferred embodiment utilizes beds of porous material to produce the desired results, it is possible to instead utilize screens within the foamer to establish the foam's characteristics.

As the foam leaves foamer 12, it is directed to applicator 14 by means of a conventional header 16 comprising a network of pipes which output at spaced locations along applicator 14. The header divides the flow of foam so that delivery to the applicator is distributed along its length which, in the case where foam is to be applied onto a wide surface such as carpeting, may be 12 or more feet.

As the foam leaves the header 16, it enters an upper portion 38 of the applicator 14 where it accumulates. The upper portion 38 of the applicator is separated from a lower portion 40 by an apertured plate 42. This plate serves to spread the foam across the applicator prior to its passage through the apertures in plate 42 to the lower portion 40 of the applicator.

Figure 4:
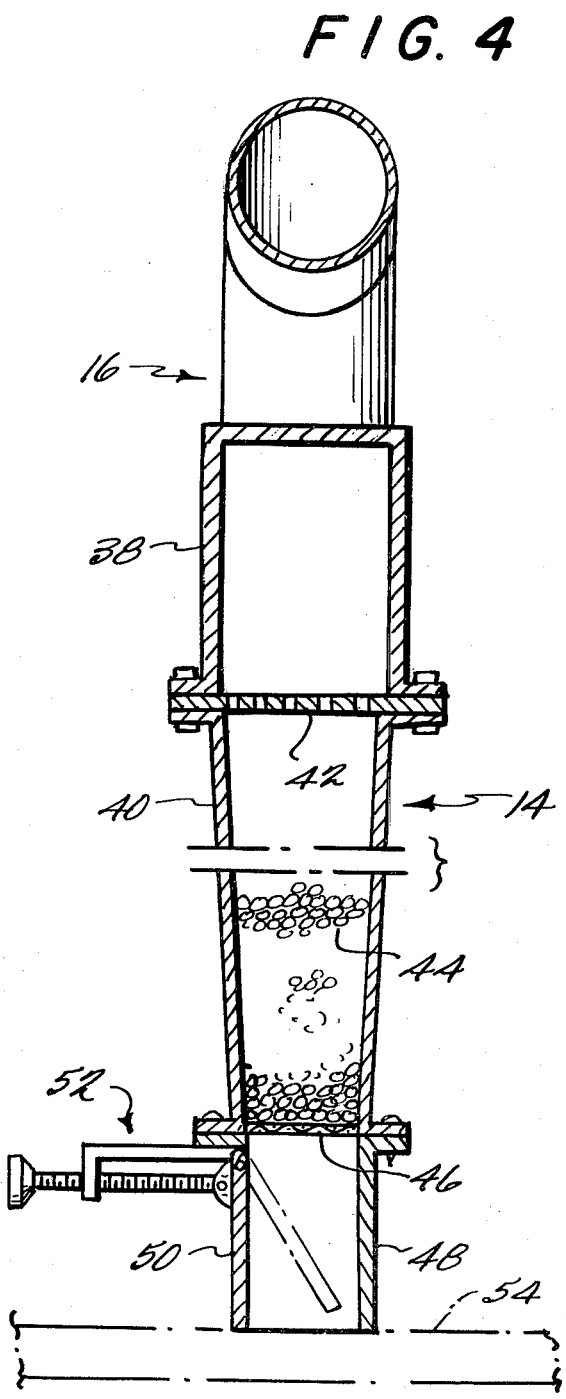
FIG. 4 is an enlarged sectional view of an applicator taken along line 4—4 of FIG. 1.

It can be appreciated from FIG. 4 that portion 40 is trapezoidal in cross-section to provide a configuration which converges toward the exit from the applicator. Portion 40 contains a bed of porous material 44. Again, various materials may be employed, although in the preferred embodiment, glass beads are utilized. The beads are retained within portion 40 by screen 46. When beads are employed, they typically are of about 4 mm size. The beads and the converging configuration of portion 40 provide a limited amount of back pressure against the flow of foam to insure uniform distribution of the foam. More particularly, the trapezoidal shape of portion 40, together with the presence of the porous bed of beads therein, resist a straight-through flow of foam, and instead, increase the tendency of the foam to flow laterally. Consequently, the foam is uniformly distributed at the exit from applicator portion 40.

If a foam discharge of fixed length and width is desired, the dimensions thereof are established by a correspondingly sized rectangular slit adjacent screen 46 which serves as a discharge orifice from the applicator 14. However, in the arrangement of FIG. 4, provisions are included to vary the width of the orifice. More particularly, a fixed wall 48 extends from one side of applicator portion 40, while a movable wall 50 is pivotally secured to portion 40 at its opposite side. A lead screw arrangement 52 is secured to portion 40 in such a manner that displacement of the screw causes the wall 50 to rotate relative to its pivot so as to selectively vary the distance between the free ends of walls 48 and 50. This variation of the discharge orifice alters the width of the stream of foam which is directed onto a textile material 54 passing the device.

While the foam producing and applying device just described is illustrated as depositing foam on a textile product passing beneath it, it will be appreciated that the invention does not rely on gravity and, therefore, can be adapted to apply foam to either or both sides of the textile.

It further is apparent that the invention can be utilized for a variety of wetting operations. The example of depositing dye onto a carpet has been discussed above. However, foam application techniques can be utilized in dyeing other textile surfaces as well as for applying liquid chemicals other than dyes, e.g., finishes, softeners, and the like.

What is claimed is:

1. A device for applying foam to textiles, comprising: a source of foam; an applicator joined to said source for receiving foam therefrom, said applicator comprising first and second portions separated by an apertured plate, said first portion being joined to the source for receiving foam therefrom, said foam being spread across the applicator by the plate and passing through the apertures therein to said second portion, said second portion containing porous material and having a configuration which converges towards an elongated discharge orifice whereby said foam is uniformly distributed across the orifice.

2. A device as set forth in claim 1, wherein said second portion of the applicator is trapezoidal in cross-section as it converges towards said discharge orifice.

3. A device as set forth in claim 2, wherein the porous material in said second portion of the applicator comprises spherical beads.

4. A device as set forth in claim 1, further comprising means for selectively altering the size of said discharge orifice.

5. A device as set forth in claim 1, wherein said source of foam comprises:
means for mixing liquid and air to develop a jet of the mixture;
a foamer joined to the mixing means for receiving said jet, said foamer including porous material through which the mixture passes to produce a foam having a desired bubble size; and
means connecting the foamer to said applicator for supplying the foam to the applicator.

6. A device as set forth in claim 5, wherein said foamer includes:
a plurality of chambers for sequentially receiving said mixture as it passes through the foamer, each chamber including porous material.

7. A device as set forth in claim 6, wherein said porous material in the foamer comprises spherical beads of a different size in each chamber.

8. A device for applying foam to textiles, comprising: means for mixing liquid and air to develop a jet of the mixture;
a foamer joined to the mixing means for receiving said jet, said foamer including porous material through which the mixture passes to produce a foam having a desired bubble size;
an applicator joined to said foamer, said applicator comprising first and second portions separated by an apertured plate, said first portion being joined to the foamer for receiving foam therefrom, said foam being spread across the applicator by the plate and passing through the apertures therein to said second portion, said second portion containing porous material and having a configuration which converges towards an elongated discharge orifice whereby said foam is uniformly distributed across the orifice.

9. A device as set forth in claim 8, wherein said second portion of the applicator is trapezoidal in cross-section as it converges towards said discharge orifice.

10. A device as set forth in claim 9, wherein the porous material in the second portion of the applicator comprises spherical beads.

11. A device as set forth in claim 10, further comprising means for selectively altering the size of said discharge opening.

12. A device as set forth in claim 8, wherein said former includes:
a plurality of chambers for sequentially receiving said mixture as it passes through the foamer, each chamber including porous material.

13. A device as set forth in claim 12, wherein said porous material in the foamer comprises spherical beads of a different size in each chamber.

* * * * *